United States Patent [19]
Kusano et al.

[11] Patent Number: 5,352,471
[45] Date of Patent: Oct. 4, 1994

[54] PROCESS FOR DRYING AND PULVERIZING FOOD RAW MATERIALS

[75] Inventors: Keigo Kusano, Kumamoto; Osamu Matsunaga; Naomasa Hayashida, both of Tochigi, all of Japan

[73] Assignee: Mitsui Kouzan Kabushiki Kaisha, Tokyo, Japan

[21] Appl. No.: 25,286

[22] Filed: Mar. 2, 1993

[30] Foreign Application Priority Data

Mar. 2, 1992 [JP] Japan .................. 4-081540

[51] Int. Cl.$^5$ .................. A23P 1/00; B02C 18/00
[52] U.S. Cl. .................. 426/518; 241/58; 241/DIG. 14; 426/416
[58] Field of Search .................. 426/416, 634, 518; 241/58, 23, 25, 29, DIG. 14

[56] References Cited
U.S. PATENT DOCUMENTS 4,915,972  4/1990  Gupta et al. .................. 426/634

Primary Examiner—George Yeung
Attorney, Agent, or Firm—David J. Archer

[57] ABSTRACT

A process for dry pulverization of food raw materials, charactrized by the process steps, which comprises
placing the food raw material in a closed vessel, evacuating the vessel to a vacuum and
effecting therein the processing operations, which comprises cutting the raw material, drying the so-disintegrated material and crushing the dried and disintegrated mass into powder, successively.

10 Claims, 2 Drawing Sheets

Prior Art Process

Inventive Process 5,352,471

PROCESS FOR DRYING AND PULVERIZING FOOD RAW MATERIALS

FIELD OF THE INVENTION

The present invention relates to a process for drying and pulverizing food raw materials of agricultural, marine and livestock products, without suffering from destruction of the useful components contained in the raw material.

BACKGROUND OF THE INVENTION

In processing a raw material of agricultural, marine and livestock products into dry powder, the conventional process comprises the process steps as shown in the flow chart of FIG. 1. In the process steps of slicing of the raw material, primary drying, gas injection treatment for improving the product quality and preservation effect, crushing, spraying addition of a liquid additive for improving the product quality and preservation effect, re-drying and dispersive mixing, or in the process steps of slicing, drying and crushing of the raw material, for the production of a dry pulverous product, the following problems are encountered:

1) A large number of devices and instruments have to be employed due to separate furnishment of each individual device and instrument for each unit operation together with the requisite insertion of handling arrangements and cushioning tanks between them.
2) The operation of such a large number of devices and instruments is bothersome with annoying maintenance works.
3) It requires a higher investment cost and a larger installation area for accomodating such a large number of devices and instruments.
4) A larger costs are required for the administration of operation of the apparatuses.
5) A deterioration of the product quality due to air oxidation is incidental to the process steps of cutting and slicing, handling and crushing of the raw material.
6) Due to the extended period for each processing of the handling and drying, the productivity is low with facilitated deterioration of the product quality.
7) A product quality deterioration due to the heat generation upon the crushing operation occurs.
8) The processing instruments and devices will be stained by deposition and clinging of the processed material during the handling operations after the spraying of the liquid additives.
9) Since the injection of the processing gas is carried out in general at ordinary pressure, there is some difficulty in its sufficient permeation into the interior of the material being processed.

OBJECT AND SUMMARY OF THE INVENTION

In consideration of the above circumstances, the object of the present invention is to provide a novel technique for drying and pulverizing food raw materials of agricultural, marine and livestock products, with simplified administration of operation of the process under reduction of the installation investment and the maintenance cost, while attaining a high productivity and higher product quality, by incorporating a special contrivance for permitting a high drying rate and by effecting all the processing operations under a vacuum condition with simultaneous reduction of the number of devices and instruments for realizing each operation by an integrated combination of the unit operations.

The above object is achieved by the process for drying and pulverizing food raw materials, which is characterized by carrying out the following process steps successively, which process steps comprise
placing the food raw material in a closed vessel,
subjecting the material to chopping or cutting while evacuating the vessel to a vacuum,
effecting drying of the so-cut material and
crushing the resulting cut material.

DETAILED DESCRIPTION OF PREFERRED EMBODIMENTS

Figure 1:
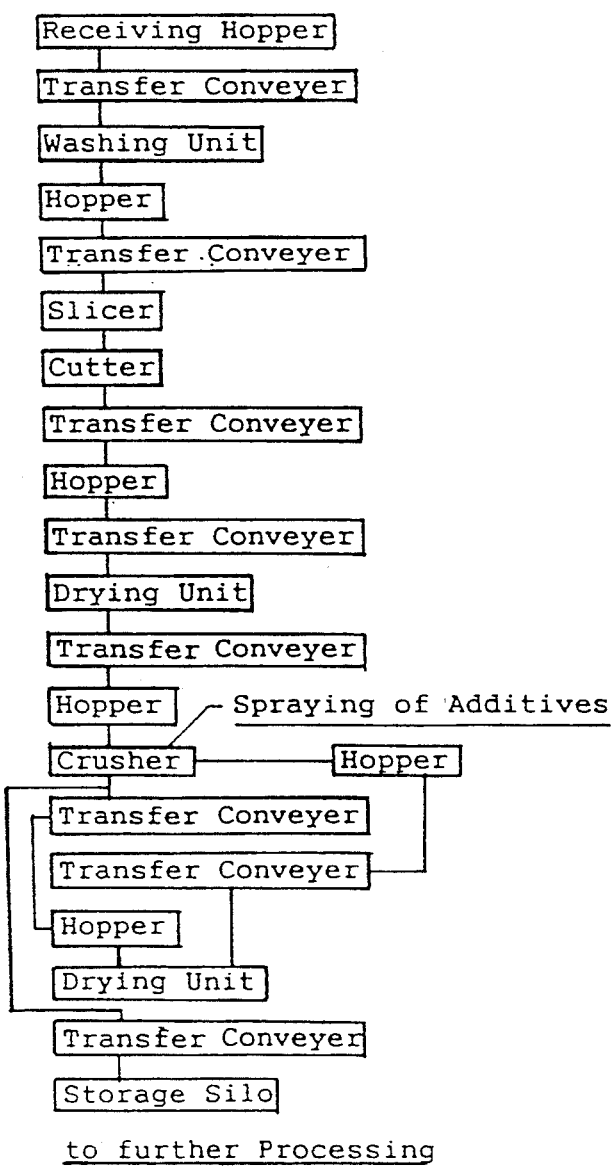
FIG. 1 shows a comparison of the flow chart of the process steps between the present invention and the prior art.
Figure 1A:
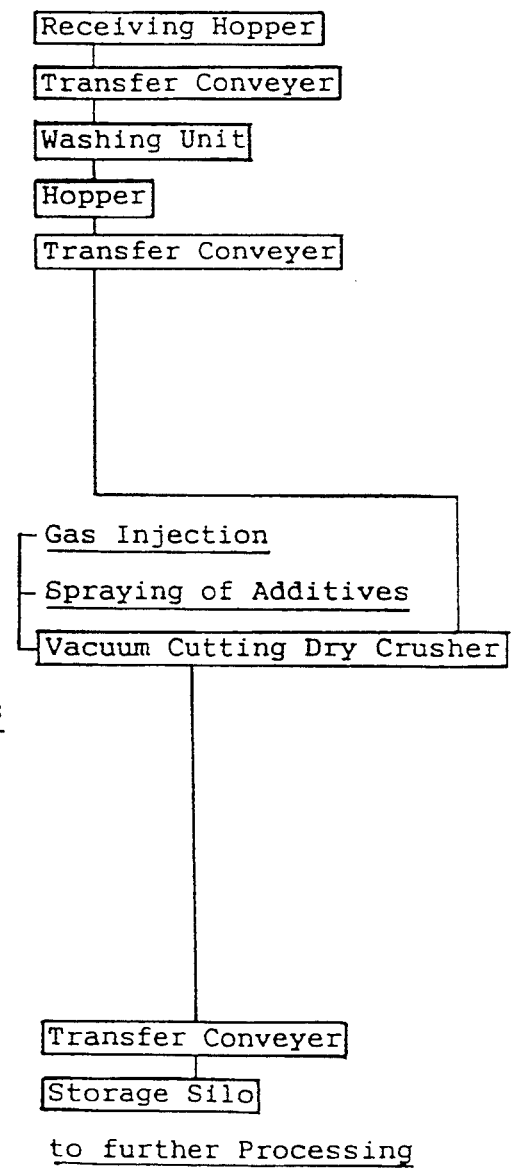
Figure 2:
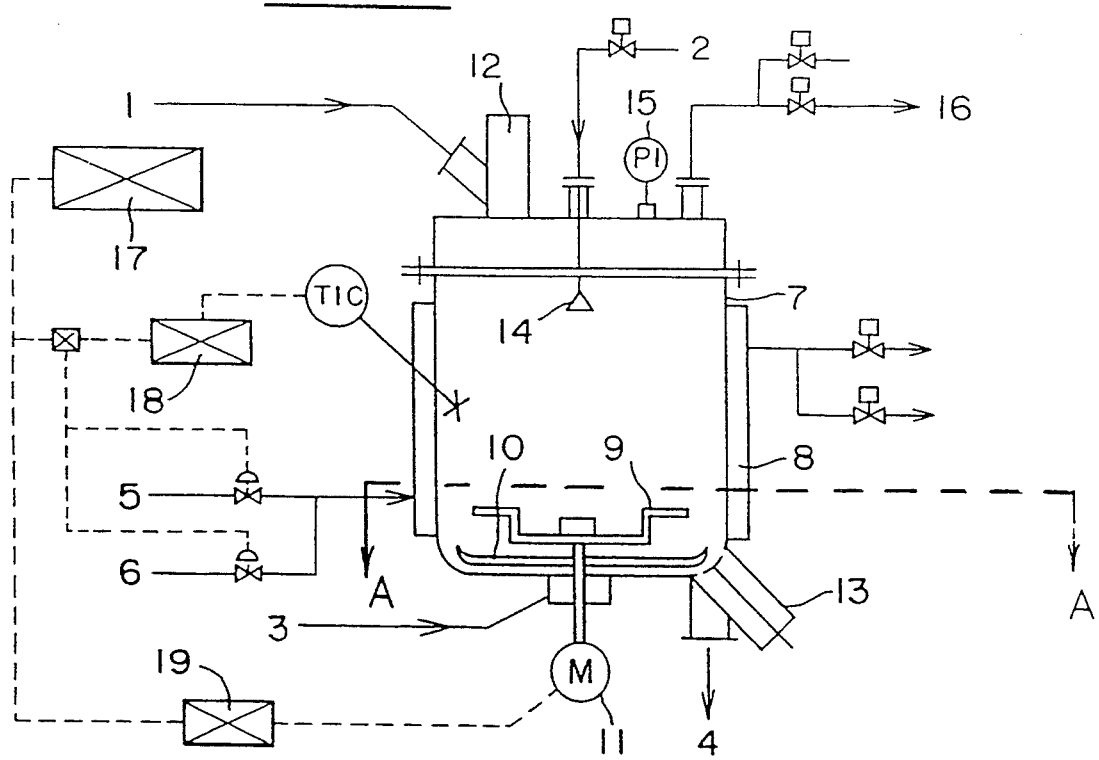
FIG. 2 illustrates an example of the processing vessel to be used according to the present invention in a schematic view.
Figure 3:
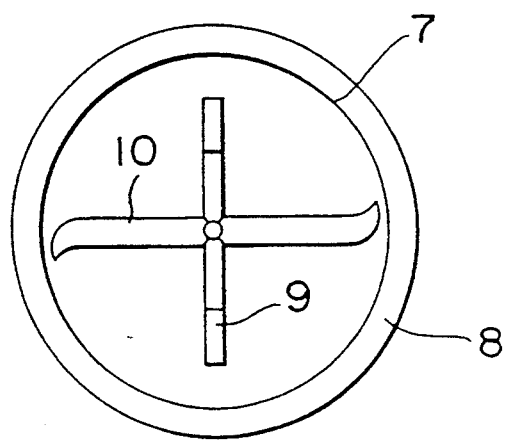
FIG. 3 is a section of the vessel of FIG. 2 along the line A—A of FIG. 2.

In the context of this specification, the "food raw material" includes every food raw material of agricultural origin, such as vegetables and fruits, of marine origin, such as fishes etc., and livestock origin, such as animal meats and poultry meats. Even a product which is not utilized at present can be used, if it shows edibility in the future.

Such a food raw material is charged in a closed vessel in the form of as-harvested state or nearly as-harvested state by being slightly processed, wherein the raw material may preferably be washed preliminarily with water. It is permissible to charge the food raw material in the vessel after it has been cut and/or dried and/or humidity-controlled. After the food raw material has been charged in the vessel, all the processing operations are effected in this vessel without the food raw material being transferred to any other vessel.

The vessel to be employed is furnished with mixing blades, a heating means and a tightly closing lid and is designed to allow the degree of vacuum of its inside space to be controlled. Every mixing blade can be used, so long as it allows cutting, crushing and mixing of the charged food raw material. For the heating means, a heating jacket surrounding the vessel can be employed, in which a hot heat medium, such as hot water or steam, is permitted to flow or other heat source, such as heater, is accomodated. For the control of the degree of vacuum in the inside space of the vessel, a vacuum pump may be installed to evacuate the vessel wherein the degree of vacuum should preferably be monitored by a vacuum gage.

By the present invention, it is contemplated to process continuously the raw material charged in the vessel under application of vacuum. The charged raw material is processed first by cutting and, then, by drying and finally by crushing of the dried material.

In a preferred embodiment of the present invention, a voluntary starting raw material is charged in the processing vessel and the lid thereof is closed tightly. The vessel is evacuated using a vacuum pump up to a degree of vacuum of 100–10 Torr, whereupon the mixing blades are started to rotate so as to effect cutting of the charged raw material. This cutting operation is continued usually for a period of 5-6 minutes for a rootcrop, until the charged rootcrop is disintegrated into particles of a size of about 1-2 mm. The so-disintegrated charge is then subjected to a drying step while rotating the mixing blade at a circumferential velocity of 10-20 m/sec under heating at a heat source temperature of 25°-50° C. and at a temperature of the processed material of 25°-30° C. It is a matter of course that the periods for the cutting and for the drying can be different for each specific condition, such as the raw material charged, its characteristic property and so on. The same applies also to the duration of the subsequent crushing operation.

When the moisture content of the processed mass has reached a value of 7-15% by weight by drying, the mixing blades are rotated at a high revolution rate to effect crushing of the so-dried granular mass. It is natural that the circumferential velocity of the mixing blade may be designed as adjustable to cope with the operation conditions for the steps of cutting, drying and crushing. Also, the temperature of the processed material during the drying can be controlled by regulating the temperature of the heating source.

In the course of the processing operations, injection of an inert gas and/or introduction of an additive into the vessel can be incorporated. If the additive is liquid and spraying thereof is required, a primary drying step may be inserted before the crushing and the spraying can be realized after the crushing step, wherein it is preferable to incorporate a second drying step and a final mixing step to prevent any agglomeration of the crushed powder and to effect a uniform distribution of the liquid additive together with a uniform consistency over the entire mass.

EXAMPLE 1

Experiment 1 for Vacuum Drying Pulverization of White Sweet Potato "KUSANO No. 1"

A raw material of rootcrop of KUSANO No. 1 with the botanical name "Lpomea batalas Lam"(a strain of white sweet potato registered according to the Agricultural Seeds and Seedlings Law of Japan) in the as-harvested form with irregular sizes and shapes was charged in a processing vessel after it had been washed with water, whereupon the processing steps of cutting, primary drying, injection of nitrogen gas, crushing of the dried cut mass, spraying of liquid additives thereonto, second drying of the processed mass and dispersing mixing of the re-dried mass were carried out in this vessel under a vacuum condition. Sampling of the material under processing was effected during each processing step by opening the vessel, together with a visual investigation of the processed material.

Separately therewith, a parallel experiment was conducted in the same way but without incorporation of the vessel opening procedures for the period of processing steps from the cutting to the crushing, in order to examine the effect of the air oxidation of the processed material on the material properties.

The following experimental conditions were employed:
Capacity of the vessel . . . 20 liters
Charged amount of the crop material . . . 5 kg
Temperature of the heat source . . . 25°-50° C.
Temperature of the crop material . . . below 30° C.
Degree of vacuum . . . 20-30 Torr
Revolution rate of the mixing blade
during the cutting . . . 1170 rpm.
during the drying . . . 400 rpm.
during the crushing . . . 1170 rpm.
during the dispersing mixing . . . 400 rpm.
Additive used consisting of
an aqueous mixture prepared by admixing to 1 liter of distilled water 15.5 g of tartaric acid, 80.0 g of citric acid, 112 g of honey with addition of other organic acids
in an amount of 150 ml per 1 kg of the dry powder of the processed mass The experimental results were as given below:
1) Cutting
A granular mass with particle sizes of 1-2 mm was obtained after a cutting period of 5 minutes.
2) Drying
The granular mass was dried up to a moisture content of 11% by weight after a drying period of 2 hours (See Table 1 below).

TABLE 1

| Drying time | Moisture cont. |
| --- | --- |
| 0 hr | 75.8% |
| 1 hr | 42.4% |
| 1.5 hr | 30.3% |
| 2 hr | 11.0% |

3) Crushing
A pulverized mass with particle sizes of about 40-250 μm was obtained after a crushing period of 3 minutes.
4) Second drying after spraying of liquid additive
The drying of the sprayed mass was reached within 30 minutes with a drying characteristic nearly the same to that of the primary drying.
5) Dispersing mixing
The mixed mass became completely homogeneous after a mixing duration of 33 minutes.
6) Air oxidation due to vessel opening procedure
The total time for the vessel to be left as being opened was about 20 minutes or so and, nevertheless, a clear difference in the hue of the product mass was recognized as compared with that in the comparison experiment without vessel opening procedure. It was therefore made clear that the material under processing should be protected against any contact thereof with air due to a handling procedure etc. as far as possible.
7) Analyzed composition of the processed product
The composition of the resulting edible supplement was assessed as given in Table 2 below, showing that valuable matters, such as inorganic components and vitamins, are retained abundantly.
8) Occurence of objectionable odour
It was confirmed that an occurrence of peculiar odour due to the injection of nitrogen gas is avoided by the spray addition of the dry distillation liquid extract.

|  | Inventive Product | Prior Art Product |
| --- | --- | --- |
| Available energy | 220 Kcal | 301 Kcal |
| Water content | 12.2 g | 13.2 g |
| Protein content | 3.4 g | 2.3 g |
| Lipid content | 1.2 g | 0.9 g |
| Carbohydrate |  |  |
| Glucide | 76.7 g | 77.1 g |
| Fiber | 4.3 g | 3.6 g |
| Ash | 2.2 g | 2.9 g |
| Calcium | 120 mg | 73 mg |
| Iron | 3.8 mg | 3.2 mg |

-continued

|  | Inventive Product | Prior Art Product |
| --- | --- | --- |
| Sodium | — | — |
| Potassium | 372 mg | 180 mg |
| Phosphor | 89 mg | 77 mg |
| β-carotene | 436 μg | 268 μg |
| Vitamin A efficiency | 310 IU | 220 IU |
| Vitamin B$_1$ | 1.8 mg | 0.9 mg |
| Vitamin B$_2$ | 1.0 mg | 0.4 mg |
| Niacin | 4.2 mg | 2.3 mg |

As described in detail above, the process according to the present invention provides a series of inventive effects as follows:

(1) It permits an integral processing of the raw material by carrying out the process steps, which comprise cutting the raw material, effecting a drying of the so-disintegrated material and crushing the so-treated mass into powdery state, and if necessary, further process steps, comprising injecting thereinto a gas, adding thereto a liquid additive by spraying it on the pulverized mass, effecting a second drying of the resulting mass and dispersingly mixing the dried mass, in one and the same processing vessel, whereby the number of devices and instruments for realizing these process steps are remarkably reduced, as these are now unnecessary, while simultaneously attaining exclusion or economization of handling apparatuses therefor and the cushioning tanks between the steps.

Moreover, the process according to the present invention brings about the following advantages:
a) Easier operation practices as compared with the prior technique, due to the considerable reduction of the number of devices and instruments.
b) A reduction of labor load in the daily works for maintaining and cleaning the installations, as compared with the prior technique, due to the considerable reduction of the number of devices and instruments.
c) A higher productivity as compared with the prior technique, due to the lower frequency of occurrence of troubles by the considerable reduction of the number of devices and instruments (the devices for effecting handling treatments that have no correlation with the intrinsic performance of the process exhibit a higher frequency of disorder occurrence).
d) A lower investment for installations, as compared with the prior technique, due to the considerable reduction of the number of devices and instruments.
e) A smaller installation area, as compared with the prior technique, due to the considerable reduction of the number of devices and instruments.
f) A lower cost for the maintenance, operation and regulation, as compared with the prior technique, due to the considerable reduction of the number of devices and instruments.
g) Exclusion of adhesion of the processed material on the surfaces of the installations such as the intermediate apparatuses, as contrasted to the prior technique, since all the processing steps are effected in one and the same vessel.

(2) By realizing all the processing operations under exclusion of air, prevention of deteriorations due to oxidation by the presence of air oxygen and processing under exclusion of pollutant bacteria in the air can effectively realized in an economical manner under an aseptic and better hygienic condition.

The technical measure of realizing the cutting and crushing of the raw material under exclusion of air is not a general practice in the stand of the technique and it is still more difficult to infer the technical measure of exclusion of the air from the devices for handling the processed material or from the cushioning tanks realistically.

By this technical measure, a product having higher quality than those of the prior art can be obtained according to the present invention. Moreover, there is a sufficient probability for realizing a better product quality according to the present invention than that attained by the freeze drying technique, since conventional freeze drying cannot overcome the problem of air oxidation and dissipation of the valuable components into the atmosphere during the process steps of cutting and handling of the processed material.

(3) According to the present invention, an improvement in the productivity and prevention of the deterioration of the product quality are achieved simultaneously by reducing the entire processing time from the raw material charging to the final mixing. For this, especially the drying periods are limited so as to preserve the requisite product quality.

(4) Activation of the effective components and improvement of the preservative property can be attained so much, as the penetration of the treating gas is facilitated by the injection thereof into the vessel held under vacuum. Thus, the present invention permits to obtain a product with better quality or, if not, a product with at least comparable quality in a more economical manner.

(5) A further contribution to the prevention of the quality deterioration is attainable by realizing the processing operation in the crushing step with cooling of the processed material preliminarily by changing over the operation mode in the final stage of the foregoing drying step from the heating mode into the cooling mode, in order to limit the temperature of the crushed mass below a certain permissible value for avoiding any quality deterioration due to heat.

(6) A prompt evaporation of moisture is attained under exclusion of oxidative deterioration of the product quality by crushing the granulated mass of the processed material under a reduced pressure to attain a larger specific surface area and to facilitate the evaporation from the solid surfaces.

In the prior technique, it is usual to effect cutting of the starting rootcrop with sharp blades in such a manner that a product cut into a shape of small dice is obtained so as not to lose the moisture content as well as the content of useful components as far as possible. There is a limitation in the size of the cut dice in view of the moisture loss and of the cutting efficiency. Thus, the process according to the present invention can afford to offer a prompter drying rate as compared with such prior technique.

In addition, the vacuum cutting technique according to the present invention is not a commonly used practice and there is no large scale apparatus commercially available therefor, so that the prior cutting technique consists in a duplicate cutting to obtain the product in the form of dice. Therefore, the practical manner of cutting in the process according to the present invention as a pretreatment for the subsequent drying is quite superior in view of the productivity and product quality as compared with the prior technique.

(7) The process according to the present invention is further superior in the drying velocity as compared with the prior technique. As the rate determining step for the drying velocity, parameters for conducting heat to the material to be processed, namely, heat transfer rate, evaporation rate and so on are considered. As the rate determining step for the heat transfer rate, the temperature difference between the material to be processed and the heat source, heat conductivity, heat conducting surface area and so on are considered. Finally, as the rate determining step for the evaporation rate, there may be considered the temperature difference between the equilibrium temperature of the vacuum system and the temperature of the material to be processed, thermal conductivity, evaporation surface area, evaporation temperature and so on.

To achieve a higher drying rate and a higher heat transfer rate, it is necessary to increase the strength of the material against agitation so as to realize an increased frequency of contact of the material with the heating surface and an increased and refreshed effective surface area for the evaporation.

If, however, a higher mixing velocity is used, a tendency to form an adhering crust or scale on the heat transfer surface is increased due to the increase in the force of splashing of the material onto the surface. The scale formation on the heat transfer surface not only hinders the heat transfer but also causes a product quality deterioration and reduction of the productivity. If a considerable scale formation occurs, the function as the drier will completely be inactivated by the hindrance of the heat transfer.

For this reason, it has been a common sense of an engineer to design a drier with a lower mixing rate for preventing such scale formation, resulting in a lower evaporation performance due to the lower rate of heat transfer and, thus, of evaporation. It has now been a subject matter to be solved, how a higher heat transfer rate can be attained while evading any scale formation on the heat transfer surface. Though the clarification of the mechanism of scale formation is not easy, the causal factors therefor may be the temperature of the heat transfer surface, temperature of the material to be processed, moisture content of the material to be processed, mixing rate and so on.

According to the present invention, a high heat transfer rate without suffering from scale formation has been achieved by regulating these causal factors in an optimum manner in each stage of the drying step.

Of course, such an optimum condition is different for each stage of the drying operation and by each specific parameter, such as the material to be processed, contemplated quality of the final product and so on. Therefore, the present invention attains such optimization by adjusting the rate of revolution of the mixing blade voluntarily and adjusting the evaporation temperature of the material to be processed by regulating the temperature of the heat source adequately to cope with the optimum condition for each specific case.

Thus, the present invention provides a novel drying technique with far higher mixing rate as contrasted to the prior technique and brings about a decrease in the heat loss upon the heating of the processed mass as well as in the energy consumption for maintaining the vacuum of the processing vessel, so that it proposes a novel drying means which is compact and superior in the contribution to the productivity.

A comparison of the processing performance for processing white sweet potato into dry powder in a plant scale of a productivity of 1 ton/day between the present invention and a typical prior technique is given in Table 3 below.

TABLE 3

| Parameter | Inventive Process | Prior Technique | Remarks |
|---|---|---|---|
| Total time of processing | 4 hr | 24 hr | |
| Drying time | 2 hr | 16 hr | |
| No. of main units | 8 units | 21 units | |
| Installation area (rel.) | 100 | 180–200 | Assuming 100 for the inven. |
| Installation investment | 100 | 130–150 | |
| Cost for maintenance | 100 | 120–130 | Assuming 100 for the inven. |
| Operability | easy | bothersome | |
| Product quality | better hue (white) | inferior hue (grey-brown) | due to air oxidation |

Thus, according to the present invention, the same amount of the final product can be obtained within a time of 1/6 of that of the prior technique. It is therefore expected that a productivity of several times of that of the prior technique will be attained on a continuous operation.

What is claimed is:

1. A process for dry pulverization of food raw materials, characterized by the process steps, comprising
   placing the food raw material in a closed vessel,
   evacuating the vessel to a vacuum and
   effecting therein the processing operations, which comprises cutting the raw material, drying the cut raw material and crushing the dried and cut material mass into powder, successively.

2. A process as claimed in claim 1, comprising placing the food raw material in a closed vessel, effecting therein the processing operations, which comprises cutting the raw material, effecting a first drying of the so-disintegrated material, crushing the dried and disintegrated mass into powder, spraying thereonto a liquid additive, effecting a second drying of the resulting mass and dispersingly mixing the so-dried mass.

3. A process as claimed in claim 1, wherein the food raw material in its substantially original form is placed in the vessel.

4. A process as claimed in claim 1, wherein the food raw material is charged in the vessel after it has been subjected preliminarily to slicing and/or drying and/or moisture-controlling.

5. A process as claimed in claim 1, wherein an inert gas is injected into the vessel during the period from the cutting to the crushing.

6. A process as claimed in claim 1, wherein said crushing is realized under incorporation of cooling of the processed material by preliminarily cooling the dried mass.

7. A process as claimed in claim 1, wherein said vessel is equipped with mixing blades and a heating means.

8. A process as claimed in claim 1, wherein said drying operation is effected under rotation of a mixing blade at a circumferential velocity of 10–20 m/sec at a heat source temperature of 25°–50° C. and at a food raw material temperature of 25°–35° C.

9. A process as claimed in claim 8, wherein said circumferential velocity of a mixing blade is different in accordance with each process step of cutting, drying or crushing.

10. A process as claimed in claim 1, wherein said vessel is provided with a means for selectively regulating the revolution rate of a mixing blade, degree of vacuum and heating temperature.

* * * * *